United States Patent
Taber

(10) Patent No.: US 6,325,019 B1
(45) Date of Patent: Dec. 4, 2001

(54) SQUIRREL-PROOF BIRDFEEDER

(76) Inventor: Bruce E. Taber, 1527 Kalteen La., Golden Valley, MN (US) 55416

( * ) Notice: Subject to any disclaimer, the term of this patent is extended or adjusted under 35 U.S.C. 154(b) by 0 days.

(21) Appl. No.: 09/597,365

(22) Filed: Jun. 19, 2000

(51) Int. Cl.$^7$ ................................................. A01K 39/00
(52) U.S. Cl. ............................................. 119/63; 119/435
(58) Field of Search ................... 119/57.8, 57.9, 119/63, 428–430, 435; D30/124–127

(56) References Cited

U.S. PATENT DOCUMENTS

| | | | |
|---|---|---|---|
| D. 302,751 | * 8/1989 | Baldwin | D30/124 |
| D. 329,509 | * 9/1992 | Burleigh | D30/124 |
| D. 360,495 | 7/1995 | Sanderson . | |
| D. 381,135 | * 7/1997 | Hochlan, Jr. | D30/124 |
| D. 407,863 | * 4/1999 | Leal et al. | D30/124 |
| 3,115,865 | * 12/1963 | Parkes et al. | 119/52 |
| 3,646,911 | * 3/1972 | Parson | 119/51 |
| 3,939,802 | * 2/1976 | Neff | 119/51 R |
| 3,977,363 | 8/1976 | Fisher, Jr. . | |
| 4,102,308 | * 7/1978 | Kilham | 119/52 R |
| 4,144,842 | * 3/1979 | Schlising | 119/52 R |
| 4,207,839 | * 6/1980 | Barry | 119/51 R |
| 5,156,112 | 10/1992 | Brown . | |
| 5,207,180 | * 5/1993 | Graham | 119/52.3 |
| 5,361,723 | 11/1994 | Burleigh . | |
| 5,375,558 | 12/1994 | Drakos . | |
| 5,392,732 | 2/1995 | Fry . | |
| 5,445,109 | * 8/1995 | Gray et al. | 119/57.9 |
| 5,676,089 | 10/1997 | Morganson . | |
| 5,678,507 | 10/1997 | Kassner . | |
| 5,690,056 | 11/1997 | Korb . | |
| 5,720,238 | 2/1998 | Drakos . | |
| 5,826,540 | 10/1998 | Bridges . | |
| 6,213,054 | * 4/2001 | Marshall | 119/57.8 |

* cited by examiner

Primary Examiner—Charles T. Jordan
Assistant Examiner—Kimberly S Smith
(74) Attorney, Agent, or Firm—Haugen Law Firm PLLP

(57) ABSTRACT

The present invention is a mobile bird feeder which is resistant to invasion and destruction by squirrels. The feeder relies upon a combination of slippery side panels made of polished methylmethacrylate (Lucite™) and a simple geometric configuration to prevent scaling by squirrels or similar small rodents. The transparent Lucite™ guard element provides protection from the weather elements, allows viewing of birds while approaching and feeding, presents an aesthetic appearance while presenting a movable target for the approaching birds.

11 Claims, 5 Drawing Sheets

SQUIRREL-PROOF BIRDFEEDER

BACKGROUND OF THE INVENTION

1. Field of the Invention

The present invention relates to a mobile bird feeder, and more particularly, to one which not only maintains and retains the feed in a dry condition, but resistant to invasion by and access to squirrels.

2. Description of Related Art

The present invention fulfills a long felt need for a bird feeder that retains the feed in a zone where it is impervious to marauding, raiding and destruction by squirrels and is complementary to its surrounding environment.

U.S. Pat. No. 3,977,363 represents one attempt to provide a squirrel-resistant bird feeder with the feeder having a dual-pitched roof and pivoting action that dumps the squirrel as it attempts to move down the roof. However, the device will not perform well for large feeders where the center of gravity is unaffected by the motion of the squirrel.

U.S. Pat. No. 4,389,975 discloses a bird feeder that may be pole-mounted and utilizes baffles with angles that render the feeder unscaleable and inaccessible. However, the use of baffles requires additional moving parts, and will not provide protection those jumping squirrels which may jump from overhead.

U.S. Pat. No. 5,195,460 discloses the use of a singular tubular post as a bird feeder support, with the use of polyvinyl chloride material as cross members to support multiple feeders. However, the polyvinyl tubes must be kept sleek and slippery with regular polishing.

None of the above devices as disclosed, either singularly or in combination, describe a device with the features of the present invention. The present squirrel-proof bird feeder is free of mechanical parts that may be subject to maintenance or deterioration problems such as rust or other types of deterioration, but instead relies on a weather-resistant material, such as methylmethacrylate. The simple geometric configuration of the present invention with the naturally polished, slippery surface prevents the squirrels from obtaining and maintaining a foothold on the feeder. Also, the use of methylmethacrylate deters the rodent from gnawing and thus destroying the feeder.

SUMMARY OF THE INVENTION

The present invention is an improved bird feeder that makes access for squirrels difficult, as difficult as the owner may require for his own objectives, while facilitating feeding of small birds including song birds and other wild birds.

The invention includes an outer guard or shroud element made from a highly-polished, slippery methylmethacrylate material such as Lucite™ in a geometric configuration which prevents squirrels from gaining or maintaining a foothold, thus denying access to the bird food. The inner food container is anchored underneath the guard element, supported from the under-surface of the guard by tubular support members, the tubular supports also being made of a methylmethacrylate material such as Lucite™.

The transparent guard element is aesthetically pleasing, and allows complete and pleasant viewing of birds while feeding.

It is an object of the invention to provide a bird feeder that is resistant to invasion by squirrels.

It is still another object of the invention to provide a bird feeder that is resistant to destruction by squirrels.

A further object of the invention is to provide a bird feeder that will protect the bird food from adverse weather elements, such as snow, wind, or rain.

A yet further object of the invention is to provide a bird feeder that is highly functional and useful while being aesthetically and architecturally pleasing.

It is another object to provide a structure with no moving parts, that is easy to assemble.

These and other objects of the invention will become apparent from the following description, drawings, and claims.

DETAILED DESCRIPTION

Figure 1:
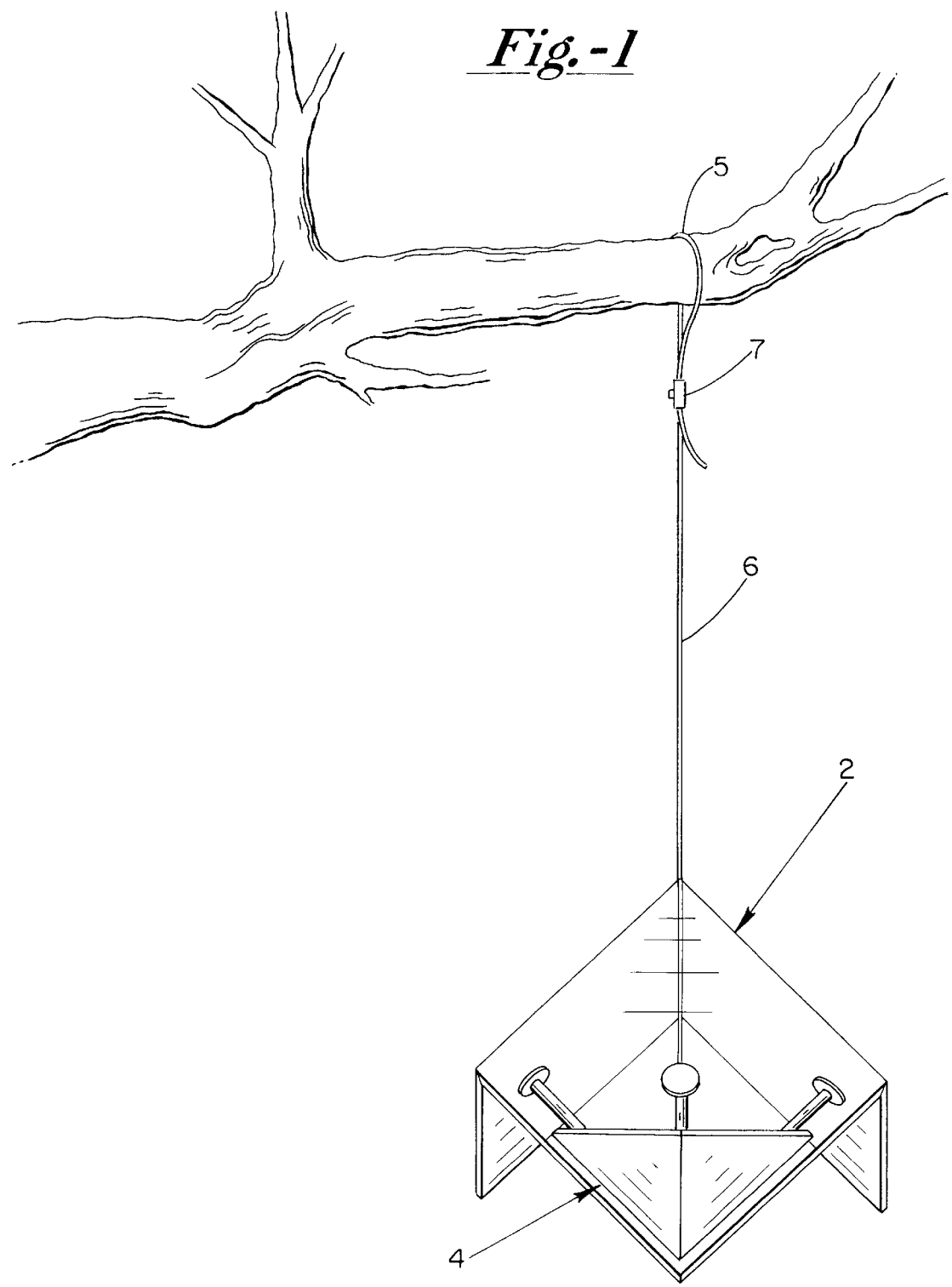
FIG. 1 is a perspective view of the birdfeeder as fully assembled and suspended from a stationary object such as a tree limb by the attached flexible cable.

FIGS. 1 through 6 illustrate one embodiment of the present invention. FIG. 1 illustrates a bird feeder having a guard element 2 which is detachably connected to an inner feed container 4. The birdfeeder is attached to a flexible cable hanger 6, which may be suspended from a stationary object, such as the horizontal limb of a tree. The guard element 2 has a passage through which the flexible cable hanger 6 passes. A second end of the cable hanger 6 is provided with a loop 5 for hanging the bird feeder. The loop 5 is secured by a crimp fastener 7.

Figure 2:
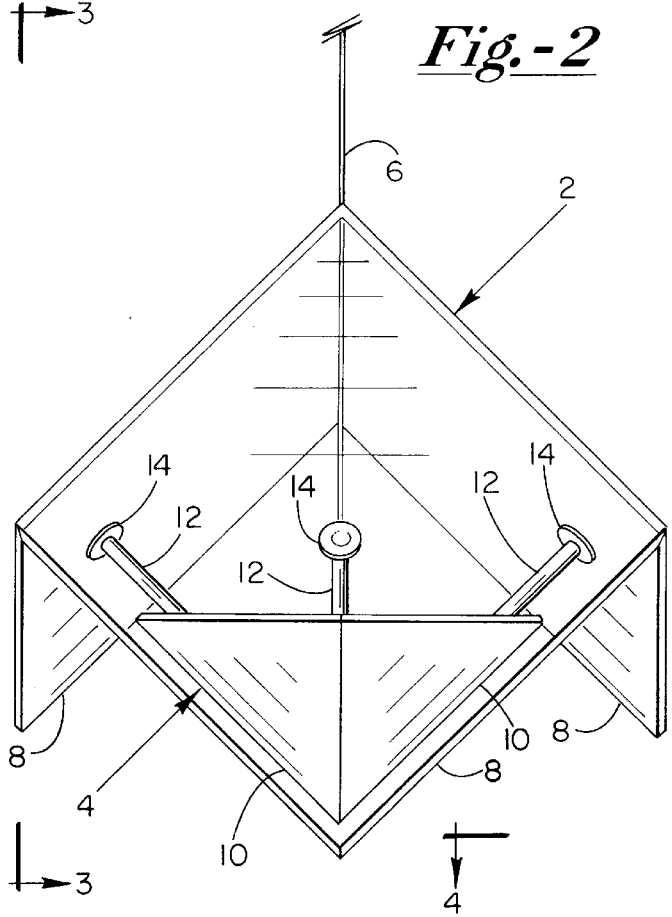
FIG. 2 is a perspective view similar to that in FIG. 1, but illustrating the bird feeder on a slightly enlarged scale.

FIG. 2 illustrates a side view of the invention shown in FIG. 1. The guard element 2 includes three equilateral panels 8 which are interconnected at two adjacent sides. The guard element 2 partially surrounds the inner feed container 4 on three sides, leaving three sides open to bird access. The inner feed container 4 includes three sloped sidewall panels 10, which are adhesively joined at the sides to form a triangular-shaped feed trough.

The removable guard element 2 is detachably joined to the inner feed container 4 by three tubular rods 12. One end of each rod 12 is inserted into one of three holes in the cube-shaped block 16, which is permanently affixed at the apex of the inner feed container 4. The opposite end of rod 12 is inserted into the receiving bore of a suction cup 14, which is removably positionally retained at a desired point on a panel 8 of guard element 2.

The panels 8 and the tubular rods 12 are all made from a transparent, highly polished methylmethacrylate such as a Lucite™ material, obtainable through E. I. DuPont de Nemours & Co. The slippery surfaces prevent squirrels from scaling or maintaining a foothold on the guard element 2, and thus preventing access to the food in the inner container 4. In addition, the material is a definite deterrent against the gnawing of rodents.

Figure 3:
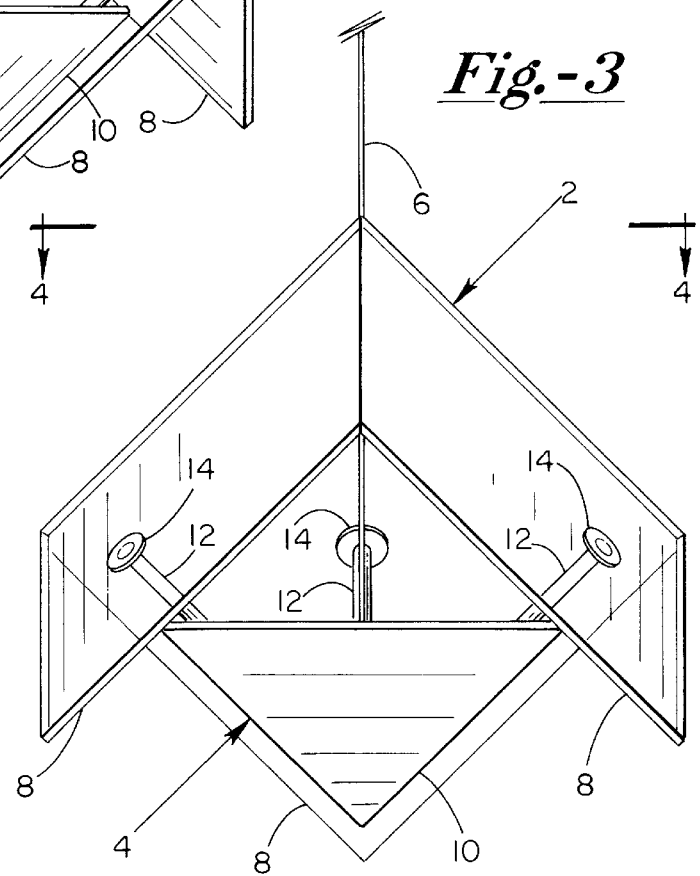
FIG. 3 is also a perspective view of the bird feeder, but taken from the side opposite to that of FIGS. 1 and 2.
Figure 4:
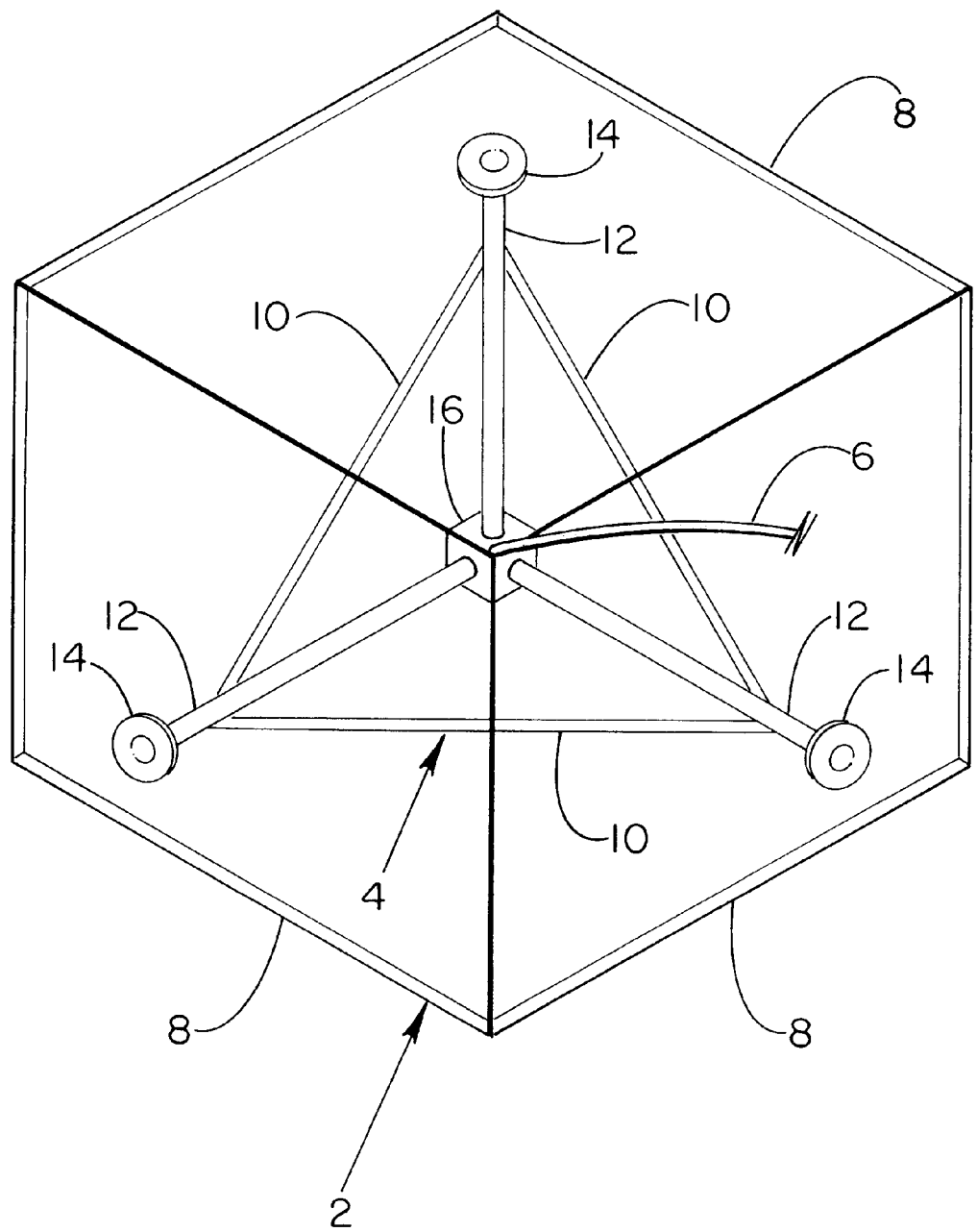
FIG. 4 is a top plan view of the bird feeder device.
Figure 5:
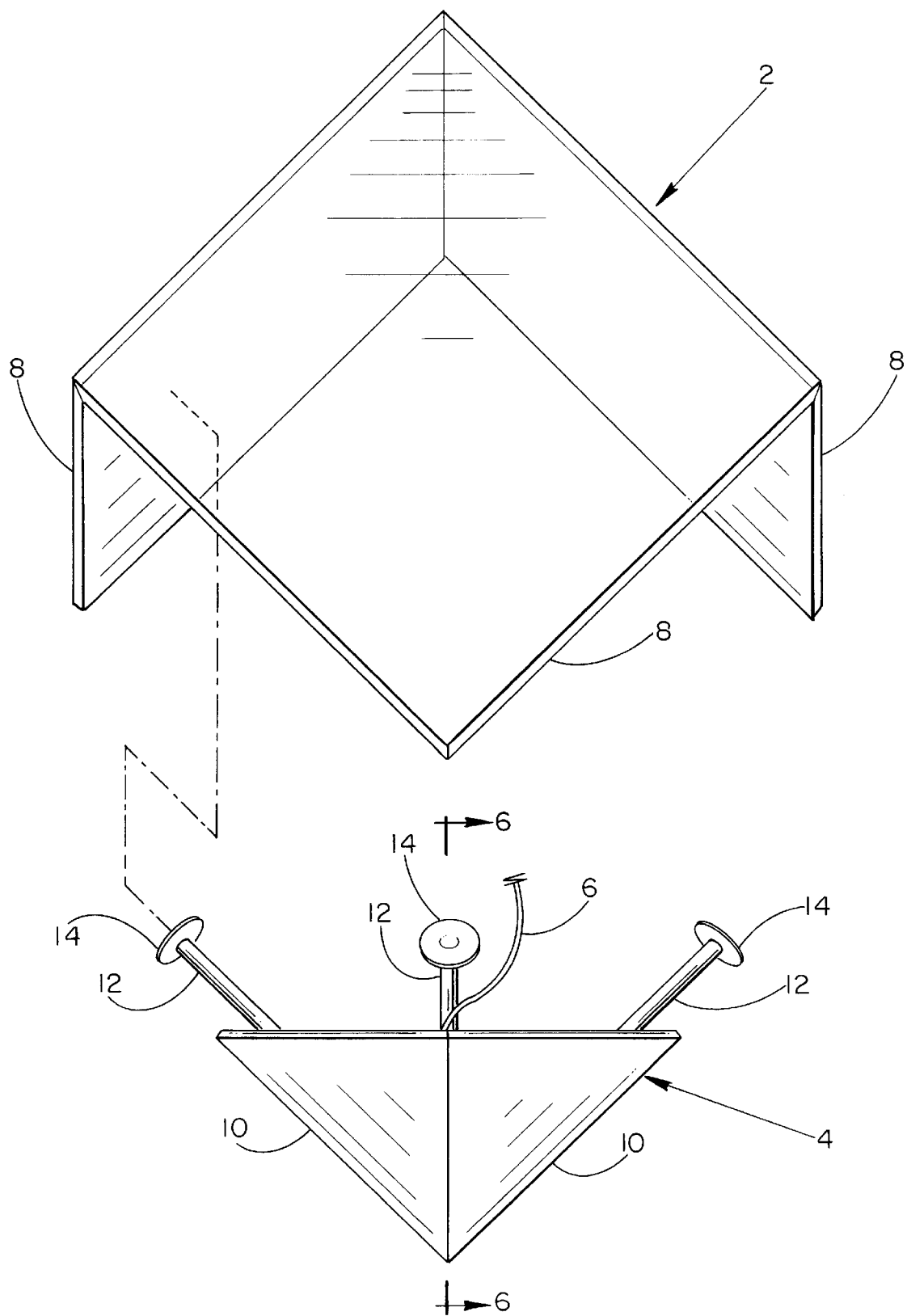
FIG. 5 is a perspective view in exploded disposition, and illustrating an alternative hanging embodiment, and showing the guard or shroud in spaced relationship to the bird feed retaining receptacle.
Figure 6:
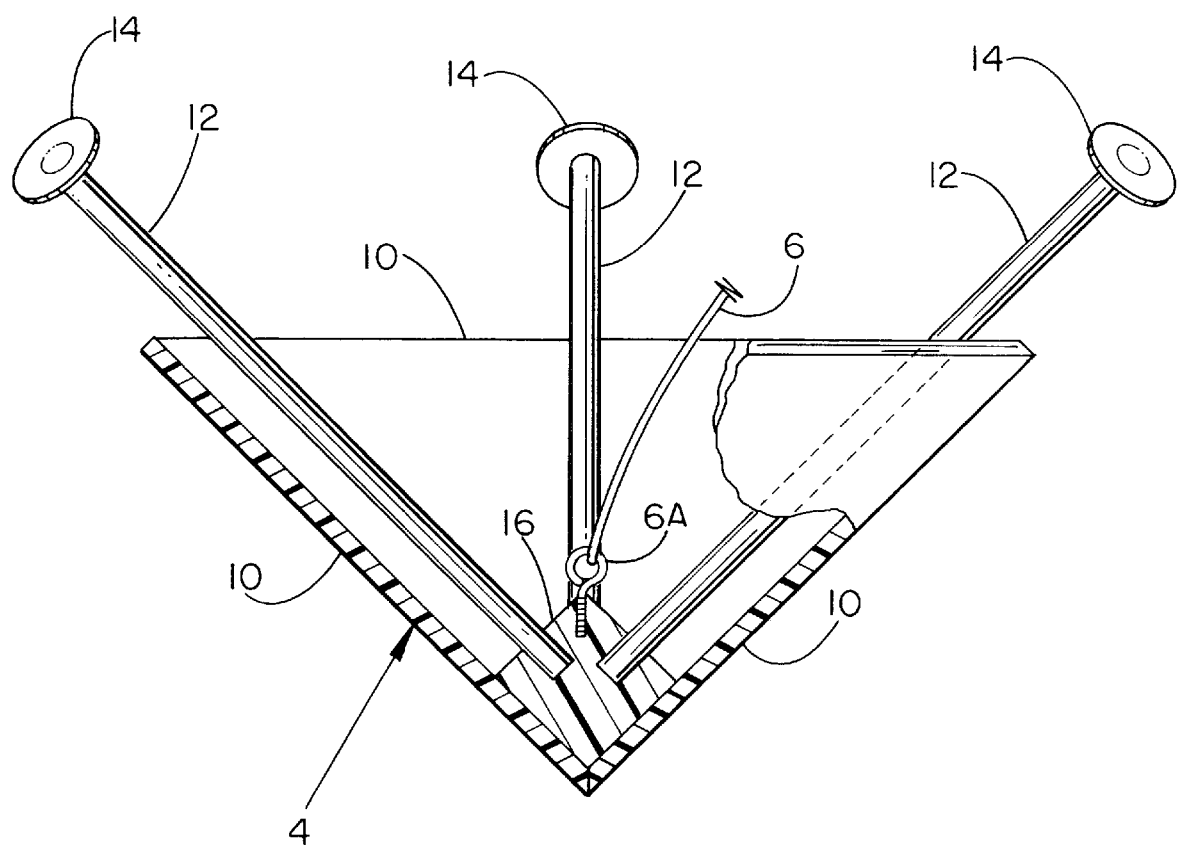
FIG. 6 is a side view, partially broken away and partially in section of an alternative hanging embodiment, and illustrating the details of the bird feed receptacle, with FIG. 6 being shown on a slightly enlarged scale.

FIG. 3 and 4 are detail views of the bird feeder. FIG. 5 illustrates how the guard element 2 interfaces with the inner feed container 4 unit, specifically the point of contact between the suction cup 14 and panel 8 of guard element 2. FIG. 6 is a cross-section of the inner feed container 4, detailing the embedded attachment of an end of rod 12 in one of three holes within block 16, it being understood that alternate arrangements of attachment may be suitably employed. The block 16 provides a convenient means for assembly of the feed retaining inner container to the assembly, and particularly providing a base which has a configuration complimentary to but in opposed relationship to the guard or shroud. In this arrangement, a screw-eye such as shown at 6A is utilized to anchor the cable hanger 6 to the assembly.

As an alternative system for mounting the feeder of the present invention, it will be appreciated that means may be provided for mounting the feeder on a stationary object such as a window, exterior building wall, or the like. In such an event, therefore, a suitable polished stand-off may be utilized to space the overall assembly from the wall so as to render it effectively squirrel-proof.

It will be appreciated that the details of the specific embodiment illustrated herein are illustrative of the invention, and are not intended to impose a restriction upon the scope of the claims to which the invention is otherwise entitled.

What is claimed is:

1. A bird feeder allowing accessibility to small birds while preventing squirrels from marauding or causing damage to the feeder, wherein the feeder comprises:
    (a) an inner container for holding feed, said container having a plurality of equilateral, sloped sidewalls and an interior portion;
    (b) a guard element partially surrounding said inner container, said guard element comprising a plurality of highly polished panels, each having equilateral sides, wherein two of said sides are adjacently interconnected;
    (c) an interconnecting means for removably adjustably engaging said inner container to said sides of said guard element; and
    (d) a cable for suspending said bird feeder from a stationary object.

2. A bird feeder as set forth in claim 1 wherein said cable provides for suspension of said bird feeder from a horizontal element.

3. A bird feeder of claim 1, wherein said interconnecting means comprises a plurality of rod members, each said rod member having an insertable end portion and an attachable end portion, said insertable end portion firmly engaging at the interior of said inner container, and said attachable end portion engaging on said panel of said guard element.

4. A bird feeder of claim 3, wherein said interconnecting means is made from methylmethacrylate material.

5. A bird feeder of claim 1, wherein said guard element is made from methylmethacrylate material.

6. A bird feeder of claim 5, wherein said methylmethacrylate material is transparent.

7. A bird feeder allowing accessibility to small birds while preventing squirrels from marauding or causing damage to the feeder, wherein the feeder comprises;
    (a) an inner container for holding feed, said container having three triangular, sloped sidewalls, said sidewalls interconnected at an interior apex portion;
    (b) a cube-shaped, removable guard element surrounding said inner container, said guard element having three open sides to enable bird access and three closed sides, each closed side comprising a highly polished panel having equilateral sides, wherein two of said equilateral sides are adjacently interconnected;
    (c) a tubular interconnecting means for attaching said inner container to each panel of said guard element; and
    (d) a flexible cable for suspending said bird feeder from a stationary object.

8. A bird feeder of claim 7, wherein said interconnecting means comprises three rigid, highly polished rod members, each said rod member having an insertable end portion and an attachable end portion, said insertable end portion firmly engaging at the apex interior portion of said inner container, and said attachable end portion engaging on said panel of said guard element.

9. A bird feeder of claim 8, wherein said interconnecting means is made from methylmethacrylate material.

10. A bird feeder of claim 8, wherein said guard element is made from methylmethacrylate material.

11. A bird feeder of claim 10, wherein said methylmethacrylate material is transparent.

* * * * *